(12) United States Patent
Moir et al.

(10) Patent No.: US 11,737,522 B2
(45) Date of Patent: Aug. 29, 2023

(54) LOCKING BUCKLE

(71) Applicant: Klick9 Supply Inc., Vancouver (CA)

(72) Inventors: Christopher Moir, Langley (CA); Marco Rota, North Vancouver (CA)

(73) Assignee: Klick9 Supply Inc., Vancouver (CA)

( * ) Notice: Subject to any disclaimer, the term of this patent is extended or adjusted under 35 U.S.C. 154(b) by 0 days.

(21) Appl. No.: 17/725,150

(22) Filed: Apr. 20, 2022

(65) Prior Publication Data

US 2022/0240630 A1 Aug. 4, 2022

Related U.S. Application Data

(63) Continuation of application No. PCT/CA2020/051424, filed on Oct. 23, 2020.

(60) Provisional application No. 62/929,298, filed on Nov. 1, 2019.

(51) Int. Cl.
*A44B 11/26* (2006.01)
*A44B 11/00* (2006.01)

(52) U.S. Cl.
CPC .......... *A44B 11/266* (2013.01); *A44B 11/006* (2013.01)

(58) Field of Classification Search
CPC ..... A44B 11/266; A44B 11/006; A44B 11/25; A44B 11/2503; A44D 2200/12
See application file for complete search history.

(56) References Cited

U.S. PATENT DOCUMENTS

| | | | |
|---|---|---|---|
| 4,035,877 A | 7/1977 | Brownson et al. | |
| 4,123,829 A * | 11/1978 | Takabatake | A44B 19/301 24/387 |
| 4,662,040 A | 5/1987 | Terrell et al. | |
| 4,685,315 A | 8/1987 | Comolli | |
| 4,903,378 A | 2/1990 | Kasai | |
| 5,309,610 A | 5/1994 | le Gal | |
| 5,774,947 A | 7/1998 | Anscher | |
| 5,774,956 A | 7/1998 | French et al. | |
| 5,893,199 A | 4/1999 | Anscher | |
| 5,926,928 A * | 7/1999 | Lundstedt | A44B 11/266 24/615 |
| 6,360,410 B1 | 3/2002 | Lovato | |
| 6,647,750 B2 | 11/2003 | Kaneko et al. | |
| 7,353,573 B2 | 4/2008 | Anscher | |

(Continued)

FOREIGN PATENT DOCUMENTS

KR 100452565 B1 12/2004

*Primary Examiner* — Robert Sandy
(74) *Attorney, Agent, or Firm* — Roni M. Jones; Oyen Wiggs Green & Mutala LLP (57) ABSTRACT

A locking buckle comprising a first buckle member and a second buckle member. The first buckle member may comprise a first strap-receiving slot for receiving a first loop end of a strap, the first strap-receiving slot is defined in part by a strap-retaining bar and a body of the first buckle member and a strap-locking bar pivotably attached to the body of the first buckle member, the strap-locking bar pivotable between an unlocked configuration in which a strap may freely pass through the first strap-receiving slot and a locked configuration in which a strap passing through strap-receiving slot is prevented from passing freely through the first strap-receiving slot. The second buckle member is connectable to the first buckle member. The second buckle member comprises a second strap-receiving slot for receiving a second loop end of the strap.

18 Claims, 9 Drawing Sheets

(56) References Cited

U.S. PATENT DOCUMENTS

| | | |
|---|---|---|
| 7,533,451 B2 * | 5/2009 | Akashi ................ A44B 19/301 70/68 |
| 7,895,719 B2 | 3/2011 | Woods |
| 2002/0133922 A1 | 9/2002 | Uehara et al. |
| 2005/0055810 A1 | 3/2005 | Loughlin et al. |
| 2006/0107497 A1 * | 5/2006 | Wung ................ A44B 11/266 24/191 |
| 2006/0218761 A1 | 10/2006 | Anscher |
| 2007/0226964 A1 | 10/2007 | Woods |
| 2014/0317893 A1 | 10/2014 | Takahashi |

* cited by examiner

LOCKING BUCKLE

RELATED APPLICATIONS

This application is a continuation of Patent Cooperation Treaty (PCT) application No. PCT/CA2020/051424 filed 23 Oct. 2020, which in turn claims priority from (and the benefit under 35 USC 119 in relation to) U.S. application No. 62/929,298 filed 1 Nov. 2019 which is hereby incorporated herein by reference. All of the applications referred to in this paragraph are hereby incorporated herein by reference.

TECHNICAL FIELD

This application relates to locking buckles. More specifically, aspects of the invention relate to side-release locking buckles.

BACKGROUND

Buckles are commonly used to fasten two loose ends of a strap. Typically, one end of the strap is fixed to a buckle and a second end of the strap is adjustably secured to the buckle such that the effective length of the strap can be adjusted as desired.

Various types of buckles exist. A side-release buckle, also sometimes referred to as a snap-fit buckle, comprises a male member and a female member. Typically, the male member comprises a center rod and two spring prongs equally spaced from the center rod. In some cases, the center rod is omitted. The female member comprises a front open side and two side holes. Each side hole may receive one of the spring prongs as the male member is inserted into the front open side of the female member. Specifically, as the male member is inserted into the front open side of the female member, the spring prongs are forced together (e.g. deformed). When the male member is completely inserted into the female member, each of the spring prongs can restoratively deform back to (or near to) its undeformed shape by protruding into one of the two side holes. Abutment of a lip or hook of each of the spring prongs with an edge of the respective side hole prevents the male member from being removed from the female member unless the spring prongs are again forced together (e.g. deformed).

Given the releasable nature of side-release buckles, they are commonly not suitable for use where it is desirable to prevent or hinder separation of the first and second ends of the strap, or to prevent or hinder adjustment of the strap length.

There is a general desire for buckles that are selectively employable to prevent or hinder separation of the first and second ends of a strap (e.g. prevent or hinder releasing of the buckle) and/or prevent or hinder adjustment of strap length while the buckle is connected.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a locking buckle comprising a first buckle member and a second buckle member connectable to the first buckle member. The first buckle member comprises a first strap-receiving slot for receiving a first loop end of a strap, the first strap-receiving slot defined in part by a strap-retaining bar and a body of the first buckle member and a strap-locking bar pivotably attached to the body of the first buckle member, the strap-locking bar pivotable between an unlocked configuration in which a strap may freely pass through the first strap-receiving slot and a locked configuration in which a strap passing through strap-receiving slot is prevented from passing freely through the first strap-receiving slot. The second buckle member comprises a second strap-receiving slot for receiving a second loop end of the strap opposite the first loop end of the strap, the second strap-receiving slot defined by a strap-receiving bar and a body of the second buckle member.

In some embodiments, the first buckle member comprises a male member and the second buckle member comprises a female member. In some embodiments, the first buckle member comprises a female member and the second buckle member comprises a male member.

In some embodiments the male member comprises a first locking loop, the female member comprises a second locking loop and wherein when the male member and the female member are connected, the first locking loop and the second locking loop align to receive a locking device. In some embodiments, the locking device comprises one of: a padlock, a locking carabiner, a zip tie, a chain lock, and a cable lock.

In some embodiments, the strap-locking bar and the body define a third strap-receiving slot and when the strap-locking bar is in the locked configuration, the third strap-receiving slot is relatively smaller than when the strap-locking bar is in the unlocked configuration.

In some embodiments, the strap-locking bar comprises a plurality of teeth that project into the third strap-receiving slot when the strap-locking bar is in the locked configuration.

In some embodiments, when the male member and the female member are connected, the strap-locking bar abuts the female member thereby preventing the strap-locking bar from pivoting from the locked configuration to the unlocked configuration. In some embodiments, when the male member and the female member are connected, the strap-locking bar abuts the female member thereby preventing the strap-locking bar from pivoting from the unlocked configuration to the locked configuration.

In some embodiments, when the male member and the female member are connected, a tab protruding from a lower receptacle wall of the female member abuts against a handle attached to the strap-locking bar when the strap-locking bar is in the locked configuration and the abutment of the tab and the handle prevents the strap-locking bar from pivoting between the locked and unlocked configurations. In some embodiments, the tab overlaps with the handle when the male member and female member are connected. In some embodiments, the handle comprises a recessed portion for receiving the tab of the female member.

In some embodiments, the locking buckle comprises a side-release buckle and the male member comprises first and second spring prongs receivable in a receptacle of the female member. In some embodiments, the first locking loop protrudes from a center rod and the first and second spring prongs are spaced apart from the center rod. In some embodiments, the second locking loop protrudes from an upper receptacle wall of the female member.

In some embodiments, the strap-locking bar comprises opposing pins pivotably received in first and second axle slots defined by the body of the male member.

In some embodiments, the strap-locking bar is attached to a handle and one of the strap-locking bar and the handle comprises a detent protrusion receivable by a detent recess defined by the body of the male member. In some embodiments, the strap-locking bar is attached to a handle and one of the strap-locking bar and the handle comprises a detent recess, wherein a detent protrusion protruding from the body of the male member is receivable in the detent recess.

Another aspect of the invention provides a dog collar comprising a locking buckle. The locking buckle comprises a first buckle member and a second buckle member connectable to the first buckle member. The first buckle member comprises a first strap-receiving slot for receiving a first loop end of a strap, the first strap-receiving slot defined in part by a strap-retaining bar and a body of the first buckle member and a strap-locking bar pivotably attached to the body of the first buckle member, the strap-locking bar pivotable between an unlocked configuration in which a strap may freely pass through the first strap-receiving slot and a locked configuration in which a strap passing through strap-receiving slot is prevented from passing freely through the first strap-receiving slot. The second buckle member comprises a second strap-receiving slot for receiving a second loop end of the strap opposite the first loop end of the strap, the second strap-receiving slot defined by a strap-receiving bar and a body of the second buckle member.

Another aspect of the invention provides a luggage strap comprising a locking buckle. The locking buckle comprises a first buckle member and a second buckle member connectable to the first buckle member. The first buckle member comprises a first strap-receiving slot for receiving a first loop end of a strap, the first strap-receiving slot defined in part by a strap-retaining bar and a body of the first buckle member and a strap-locking bar pivotably attached to the body of the first buckle member, the strap-locking bar pivotable between an unlocked configuration in which a strap may freely pass through the first strap-receiving slot and a locked configuration in which a strap passing through strap-receiving slot is prevented from passing freely through the first strap-receiving slot. The second buckle member comprises a second strap-receiving slot for receiving a second loop end of the strap opposite the first loop end of the strap, the second strap-receiving slot defined by a strap-receiving bar and a body of the second buckle member.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

One aspect of the invention provides a locking buckle. The locking buckle may comprise a male member and a female member, the female member is connectable to the male member. The male member may comprise a first strap-receiving slot for receiving a first end of a strap. The first strap-receiving slot may be defined in part by a strap-retaining bar and a body of the male member. A strap-locking bar may be pivotable between a locked configuration in which a strap may freely pass through the first strap-receiving slot and an unlocked configuration in which a strap passing through strap-receiving slot is fixed. The female member may comprise a second strap-receiving slot for receiving a second end of the strap. In some embodiments, when the male member and the female member are connected, a first locking loop of the male member and a second locking loop of the female member may define an aperture for receiving a locking device such as a padlock or the like.

Figure 1:
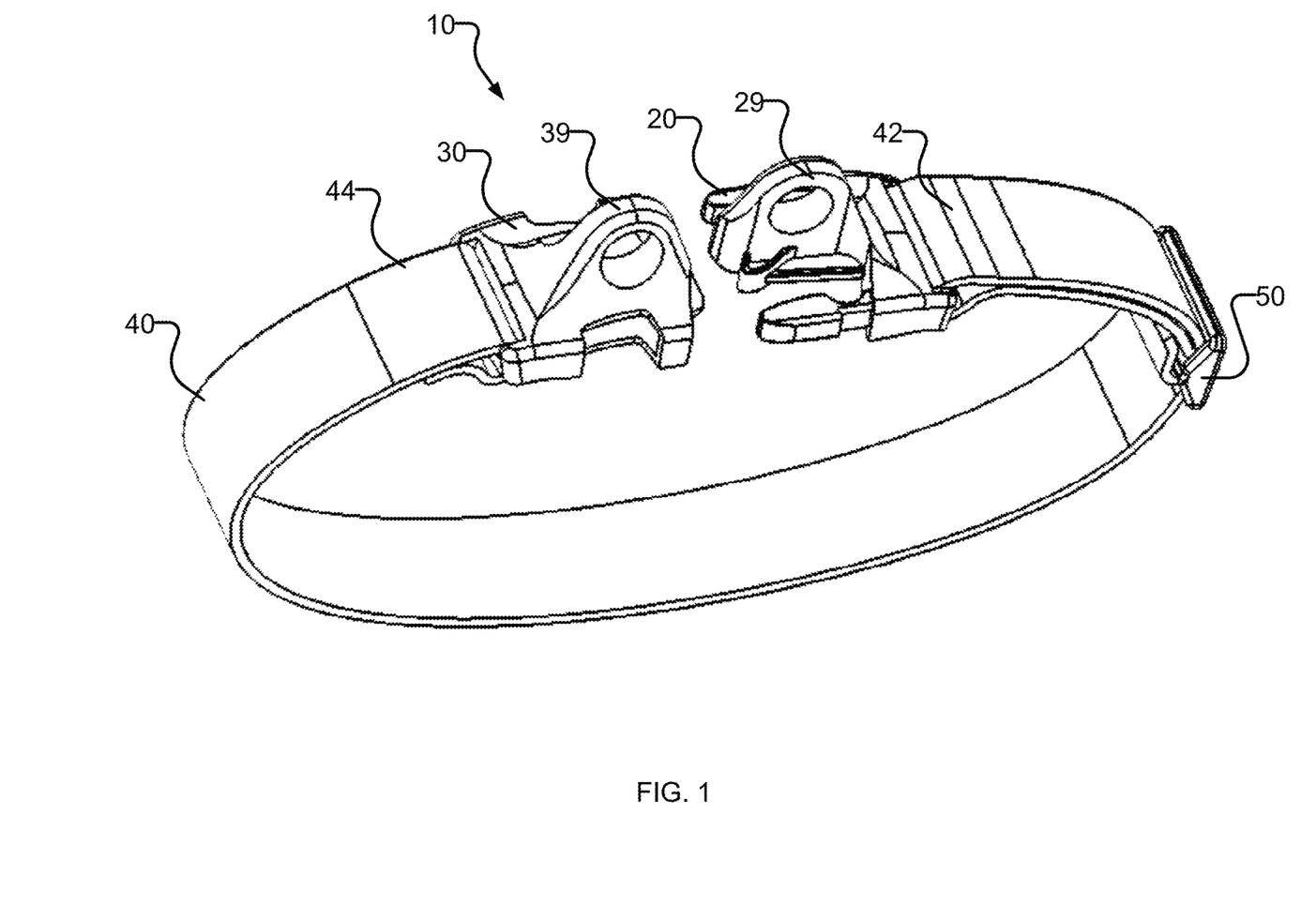
FIG. 1 is an isometric view of an open locking buckle and a strap according to an exemplary embodiment of the invention.
Figure 2:
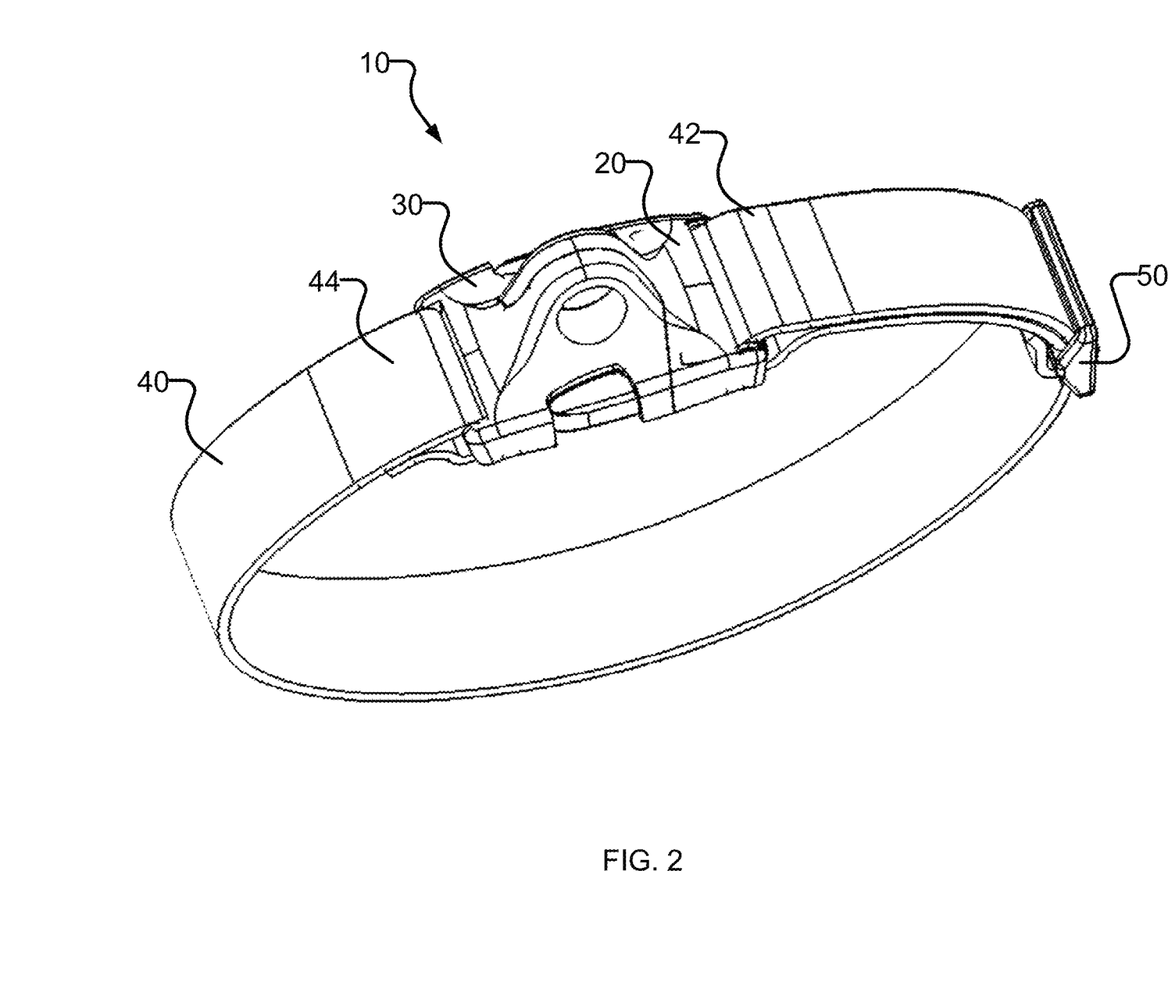
FIG. 2 is an isometric view of a closed locking buckle and a strap according to an exemplary embodiment of the invention.

FIG. 1 is an isometric view of a locking buckle 10 and a strap 40 according to one exemplary embodiment of the invention. Locking buckle 10 comprises a male member 20 and a female member 30. Male member 20 may be releasably lockingly connectable to female member 30 as shown in FIG. 2.

Figure 3:
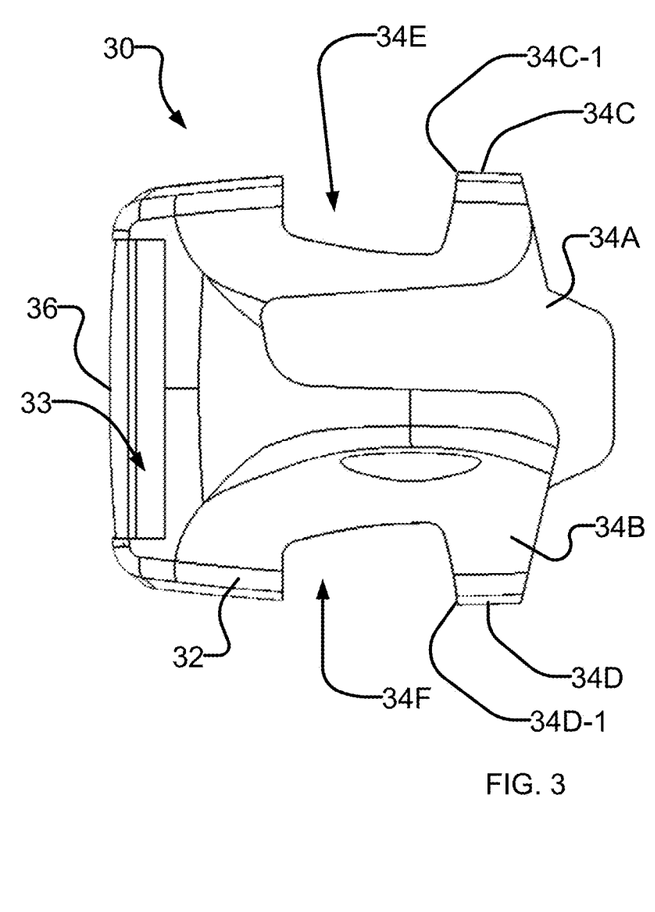
FIG. 3 is a top plan view of an open locking buckle according to an exemplary embodiment of the invention.

Male member 20 comprises a body 22, a center rod 26A and first and second spring prongs 26B, 26C (see FIG. 3). While the depicted embodiment comprises a center rod 26A, it should be understood that center rod 26A is not mandatory and could be omitted.

Female member 30 comprises a body 32, a lower receptacle wall 34A, an upper receptacle wall 34B and first and second receptacle side walls 34C, 34D (see FIG. 3). Together lower receptacle wall 34A, upper receptacle wall 34B and first and second receptacle side walls 34C, 34D define a receptacle 35. A first side aperture 34E is defined by one or more of lower receptacle wall 34A, upper receptacle wall 34B and first receptacle side wall 34C. First side aperture 34E opens into receptacle 35. A second side aperture 34F is defined by one or more of lower receptacle wall 34A, upper receptacle wall 34B and second receptacle side wall 34D. Second side aperture 34F opens into receptacle 35.

Male member 20 may be releasably lockingly connected to female member 30 by forcing center rod 26A (if present) and first and second spring prongs 26B, 26C of male member 20 into receptacle 35 through opening 36A of female member 30. Specifically, as center rod 26A and first and second spring prongs 26B, 26C of male member 20 are forced into opening 36A of receptacle 35, beveled tips 26B-1, 26C-1 of first and second spring prongs 26B, 26C contact first and second side walls 34C, 34D. Due to the beveled nature of tips 26B-1, 26C-1, first and second spring prongs 26B, 26C are deflected inwardly toward center rod 26A as center rod 26A and first and second spring prongs 26B, 26C of male member 20 are forced further into receptacle 35 of female member 30 thereby resiliently (e.g. elastically) deforming first and second spring prongs 26B, 26C inwardly toward center rod 26A. Such deformation of first and second spring prongs 26B, 26C allows center rod 26A (if present) and first and second spring prongs 26B, 26C of male member 20 to enter further into receptacle 35.

Once first and second spring prongs 26B, 26C have entered sufficiently far into receptacle 35 that hooks 26B-2, 26C-2 of first and second spring prongs 26B, 26C have passed edges 34C-1, 34D-1 of side walls 34C, 34D, first and second spring prongs 26B, 26C may restoratively deform (e.g. return to their original non-deformed shapes, or close thereto, due to the elastic nature of first and second spring prongs 26B, 26C) outwardly away from center rod 26A such that first and second spring prongs 26B, 26C protrude at least partially through first and second side apertures 34D, 34E and first and second hooks 26B-1, 26C-2 engage edges 34C-1, 34D-1. The engagement of first and second hooks 26B-1, 26C-2 with edges 34C-1, 34D-1 may prevent relative movement between male member 20 and female member 30 thereby lockingly connecting male member 20 to female member 30.

Male member 20 and female member 30 may be released from one another by applying inward force (e.g. force toward center rod 26A) to first and second spring prongs 26B, 26C, thereby disengaging first and second hooks 26B-1, 26C-2 from edges 34C-1, 34D-1 and allowing relative movement between male member 20 and female member 30.

Male member 20 may comprise a strap retaining bar 24 attached to body 22. Together, body 22 and strap-retaining bar 24 define a first strap-receiving slot 23. A strap 40 may be threaded through first strap-receiving slot 23 such that a first loop end 42 of strap 40 loops around strap-retaining bar 24 as shown in FIGS. 1 and 2. First strap-receiving slot 23 may be sized to allow strap 40 to slide freely through first strap-receiving slot 23 when strap 40 is not under tension. In contrast, when strap 40 is under tension, friction between strap-retaining bar 24 and strap 40 may hinder, although not prevent, movement of strap 40 through first strap-receiving slot 23.

Female member 30 may comprise a strap retaining bar 36 attached to body 32. Together, body 32 and strap-retaining bar 36 define a strap-receiving slot 33. Strap 40 may be threaded through strap-receiving slot 33 such that a second loop end 44 of strap 40 loops around strap-retaining bar 36 as shown in FIGS. 1 and 2. Strap-receiving slot 33 may be sized to allow strap 40 to slide freely through strap-receiving slot 33 when strap 40 is not under tension. In contrast, when strap 40 is under tension, friction between strap-retaining bar 36 and strap 40 may hinder, although not prevent, movement of strap 40 through strap-receiving slot 33.

First loop end 42 may be adjustable via an adjustable slider 50. By adjusting the positioning of adjustable slider 50, the length of strap 40 between first loop end 42 and second loop end 44 may be adjusted. Second loop end 44 may be fixed, as shown in FIGS. 1 and 2. Alternatively, second loop end 44 may also be adjustable.

Strap 40 may comprise any suitable strap. For example, strap 40 may comprise webbing such as nylon webbing, cotton webbing, polyester webbing, polypropylene webbing, elastane webbing, hemp webbing, etc. Alternatively, strap 40 may comprise a polyurethane strap, a woven strap, a composite strap, a corded strap, a leather strap, etc. Strap 40 may comprise two of such straps attached to one another via locking buckle 10.

Figure 4:
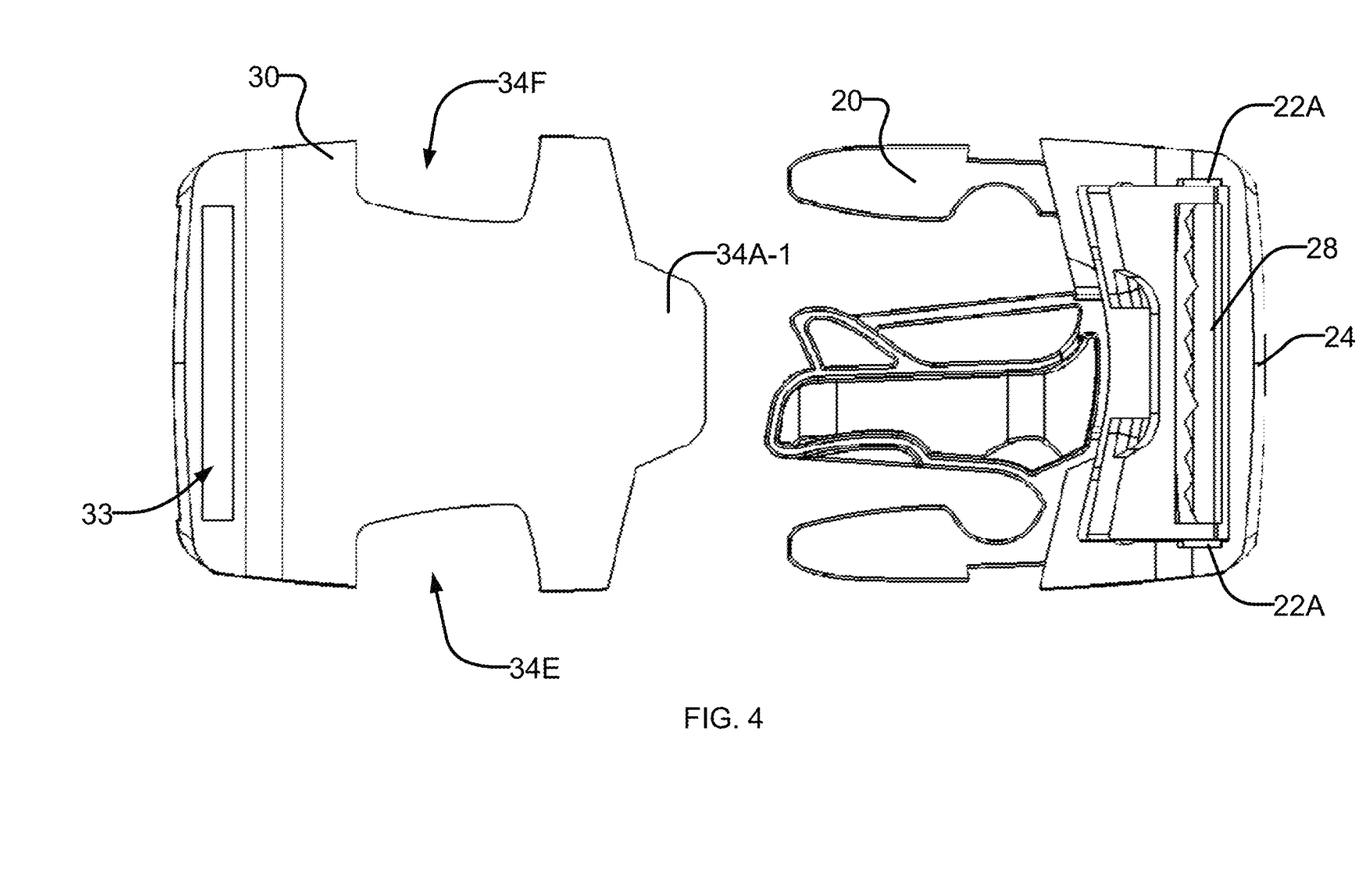
FIG. 4 is a bottom plan view of an open locking buckle according to an exemplary embodiment of the invention.
Figure 6:
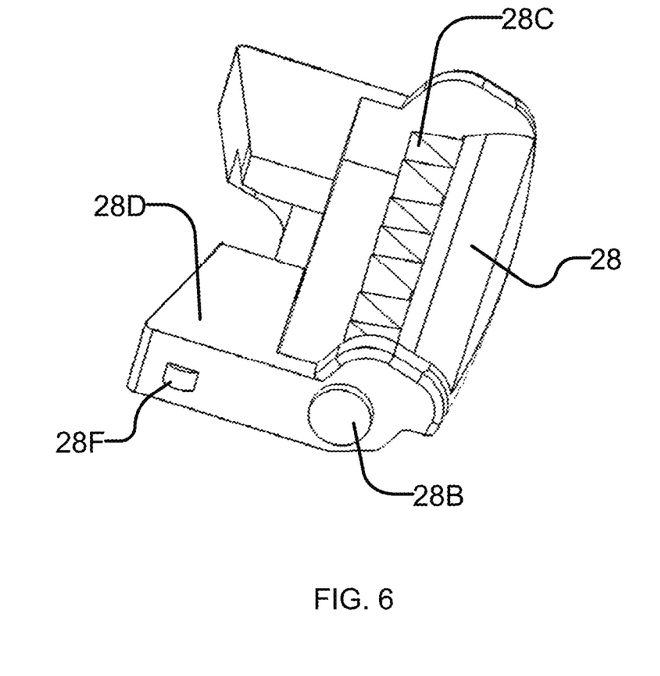
FIG. 6 is an isometric view of a strap-locking bar of a locking buckle according to an exemplary embodiment of the invention.

In some embodiments, a strap-locking bar 28 is pivotably attachable to body 22 to selectively fix first loop end 42 of strap 40. In some embodiments, strap-locking bar 28 may be pivotably attached to body 32 to selectively fix second loop end 44 of strap 40. As best seen in FIG. 6, strap-locking bar 28 comprises first and second axle pins 28B. First and second axle pins 28B may be received in first and second axle slots 22A (see FIG. 4) of body 22 to allow strap-locking bar 28 to pivot relative to body 22 of male member 20. In particular, strap-locking bar 28 may be selectively pivotable between a locked configuration and an unlocked configuration.

In the unlocked configuration, strap 40 may freely pass through the first strap-receiving slot 23. In the locked configuration, strap 40 may be fixed or substantially prevented from traveling freely through first strap-receiving slot 23. More specifically, in the unlocked configuration, strap-locking bar 28 does not substantially alter the path of strap 40 through first strap-receiving slot 23. In contrast, in the locked configuration, strap-locking bar 28 is pivoted into a position relatively closer to body 22 thereby reducing a spacing between strap-locking bar 28 and body 22 through which strap 40 passes. In this way, friction between strap-locking bar 28 and strap 40 and/or friction between body 22 and strap 40 may prevent or substantially hinder movement of strap 40 through first strap-receiving slot 23. In some embodiments, strap-locking bar 28 comprises one or more teeth 28C to increase friction between strap-locking bar 28 and strap 40 when strap-locking bar 28 is in the locked configuration.

In some embodiments, as strap-locking bar 28 is pivoted into the locked configuration, strap 40 is clamped between strap-locking bar 28 and body 22. Such clamping may cause elastic or plastic deformation of strap 40, thereby increasing friction between strap-locking bar 28 and strap 40 and/or friction between body 22 and strap 40.

Figure 7A:
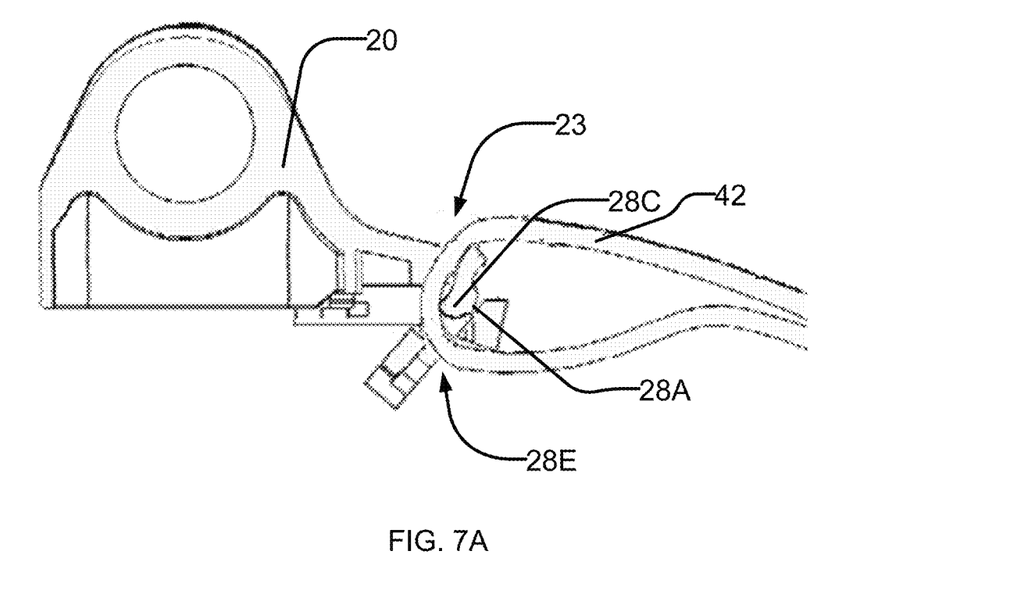
FIG. 7A is a side view of a cross-section of a male member of a locking buckle with an unlocked strap-locking bar according to an exemplary embodiment of the invention.
Figure 7B:
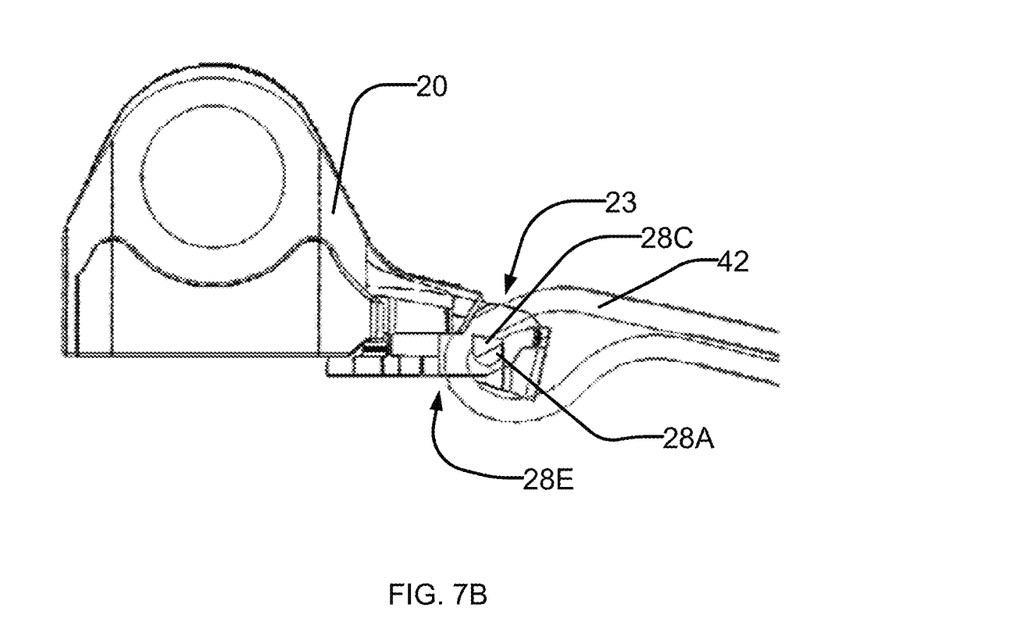
FIG. 7B is a side view of a cross-section of a male member of a locking buckle with a locked strap-locking bar according to an exemplary embodiment of the invention.

In some embodiments, strap-locking bar 28 comprises a handle 28D. Handle 28D may be gripped by a user to selectively pivot strap-locking bar 28 between the locked configuration and the unlocked configuration. Together, handle 28D and strap-locking bar 28 may define a second strap-receiving slot 28E through which strap 40 is passed. When strap-locking bar 28 is in the unlocked configuration, strap 40 may freely pass through each of first strap-receiving slot 23 and second strap-receiving slot 28E as shown in FIG. 7A. In contrast, when strap-locking bar 28 is in the locked configuration, strap 40 may be prevented or substantially hindered from moving through first strap-receiving slot 23 and second strap-receiving slot 28E by an offset between first strap-receiving slot 23 and second strap-receiving slot 28E which pinches strap 40 between strap-locking bar 28 and body 22, as shown in FIG. 7B.

Figure 8:
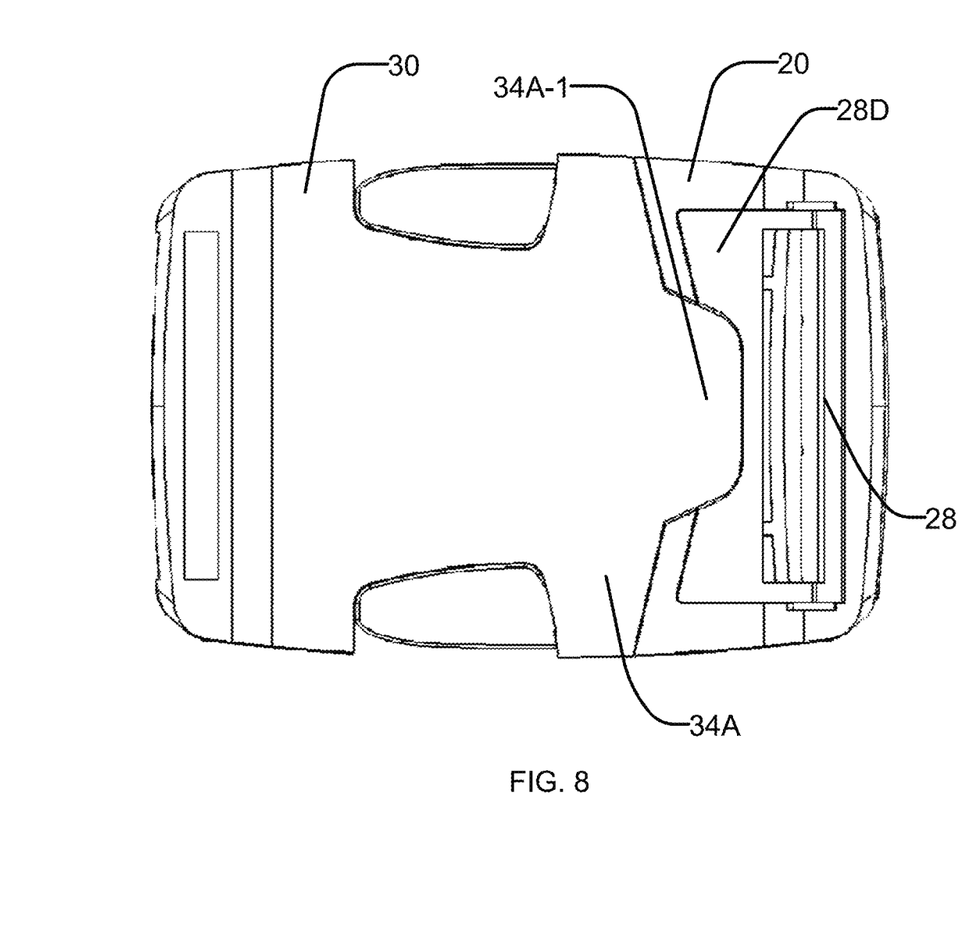
FIG. 8 is a bottom plan view of a closed locking buckle according to an exemplary embodiment of the invention.

In some embodiments, when male member 20 and female member 30 are lockingly engaged, a portion of female member 30 may abut handle 28D thereby preventing strap-locking bar 28 from being selectively pivoted from the locked configuration to the unlocked configuration (or vice versa) until male member 20 and female member 30 are disengaged. For example, as shown in the FIG. 8, tab 34A-1 of lower receptacle wall 34A overlaps with and/or abuts strap-locking bar 28 such that strap-locking bar 28 is prevented from being pivoted from the locked configuration to the unlocked configuration (or vice versa) until male member 20 and female member 30 are disengaged. In some embodiments, tab 34A-1 abuts handle 28D. In some embodiments, handle 28D comprises a recess for receiving a tab 34A-1 or a portion of tab 34A-1.

In some embodiments, strap-locking bar 28 may comprise a detent mechanism to hold strap-locking bar 28 in its current configuration. For example, when strap-locking bar 28 is in the locked configuration, the detent mechanism may resist strap-locking bar 28 pivoting into the unlocked configuration. Similarly, when strap-locking bar 28 is in the unlocked configuration, the detent mechanism may resist strap-locking bar 28 pivoting into the locked configuration. This detent mechanism may, for example, facilitate handling of locking buckle 10 by preventing strap-locking bar 28 from pivoting undesirably between the locked and unlocked configurations. The detent mechanism may comprise a detent protrusion 28F protruding from strap-locking bar 28 and/or a recess in body 22 for receiving detent protrusion 28F. Alternatively, strap-locking bar 28 may comprise a recess for receiving a detent protrusion protruding from body 22.

Figure 5:
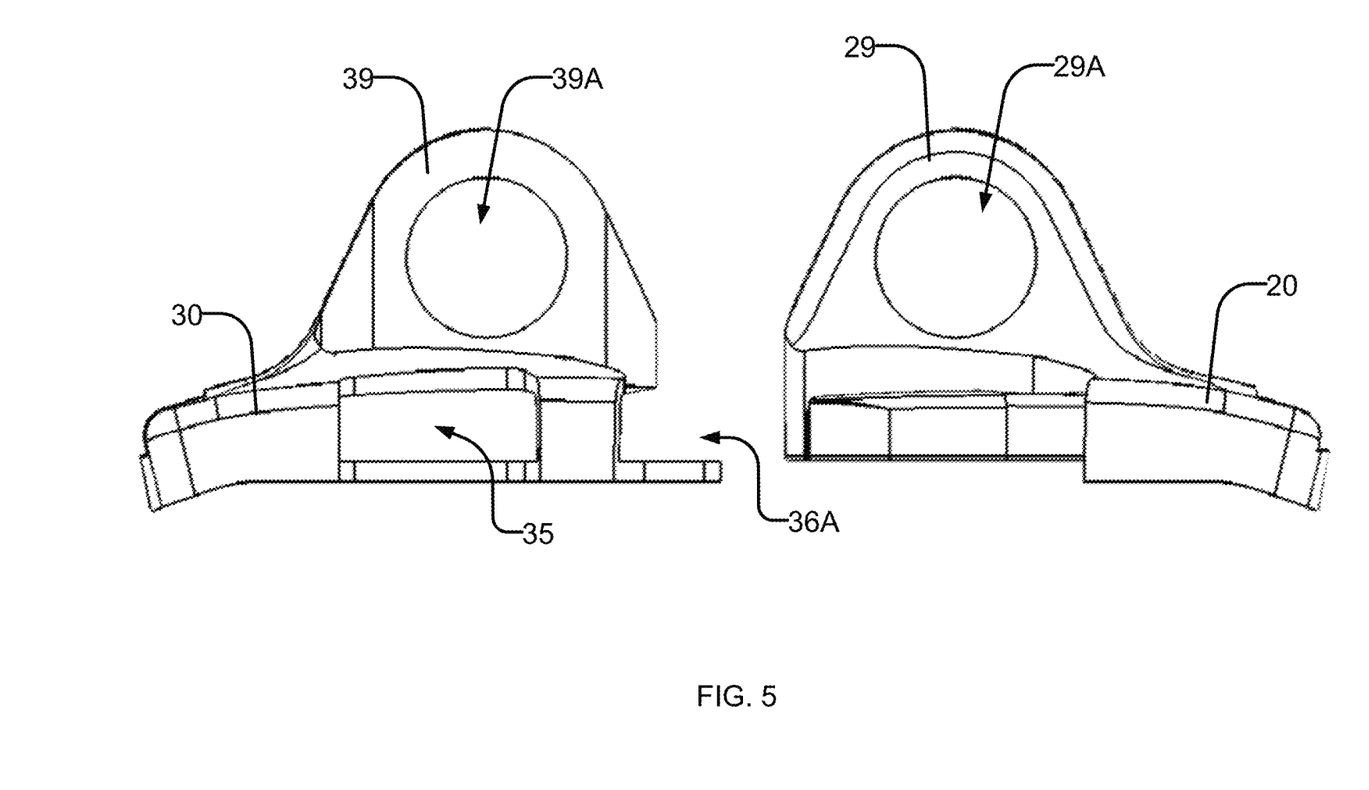
FIG. 5 is a side view of an open locking buckle according to an exemplary embodiment of the invention.

Male member 20 may comprise a first locking loop 29 as shown in FIG. 5. First locking loop 29 defines a first locking aperture 29A. First locking loop 29 of male locking member may protrude from one or more of body 22, center rod 26A and first and second spring prongs 26B, 26C. For example, in the depicted embodiment, first locking loop 29 protrudes from body 22 and center rod 26A. This is not mandatory. In other embodiments, center rod 26A may be omitted and first locking loop 29 may protrude from body 22 or otherwise.

Female member 30 may comprise a second locking loop 39 as shown in FIG. 5. Second locking loop 39 defines a second locking aperture 39A. Second locking loop 39 may protrude from one or more of body 32 and receptacle walls 34A, 34B, 34C, 34D of female member 30.

When male member 20 and female member 30 are lockingly engaged, first locking loop 29 and second locking loop 39 may be aligned such that first locking aperture 29A is aligned with second locking aperture 39A. When first and second locking loops 29, 39 are aligned, a locking device may be passed through both first locking aperture 29A and second locking aperture 39A. Exemplary, non-limiting examples of locking devices include padlocks, zip ties, cables, chains, twist-ties, locking carabiners, or the like. Passing a locking device through first and second locking apertures 29A, 39A may:

(1) secure first locking aperture 29A in at least partial alignment with second locking aperture 39A;
(2) secure first locking loop 29 in alignment with second locking loop 39;
(3) secure male member 20 in at least partial locking engagement with female member 30; and/or
(4) secure strap-locking bar 28 in the locked or in the unlocked configuration.

In this way, if a locking device is passed through first and second locking apertures 29A, 39A, then male member 20 and female member 30 are locked together. Moreover, if male member 20 and female member 30 are lockingly engaged, a locking device is passed through first and second locking apertures 29A, 39A and strap-locking bar 28 is in the locked configuration, the length of strap 40 cannot be changed by adjusting first loop 42 and male member 20 and female member 30 cannot be separated without irreparably damaging strap 40, locking buckle 10 or the locking device. Accordingly, buckle 10 can be employed to provide a secure connection between two ends of strap 40 while minimizing a risk that strap 40 will be loosened and/or removed. Such characteristics of locking buckle 10 may be beneficial in a number of situations.

As a non-limiting example, locking buckle 10 may be employed as part of a luggage strap to prevent a piece of luggage from being undesirably opened. Previous luggage straps could easily be removed by (1) releasing the side-release buckle that fastened the strap; and/or (2) loosening the strap and sliding the strap off of the luggage. In contrast, by passing a securing device through first and second locking loops 29A, 39A of locking buckle 10, a would-be thief is prevented from releasing buckle 10 without first removing the securing device. Furthermore, the would-be thief is prevented from loosening the strap (e.g. strap 40) and sliding the strap off of the luggage since strap-locking bar 28 prevents or substantially hinders the adjustability of strap 40, as described herein. Nonetheless, when the locking device is removed, it is possible to release the luggage strap and/or adjust the length of the luggage strap as desired. In this way, locking buckle 10 may be advantageously employed for luggage straps.

Figure 9:
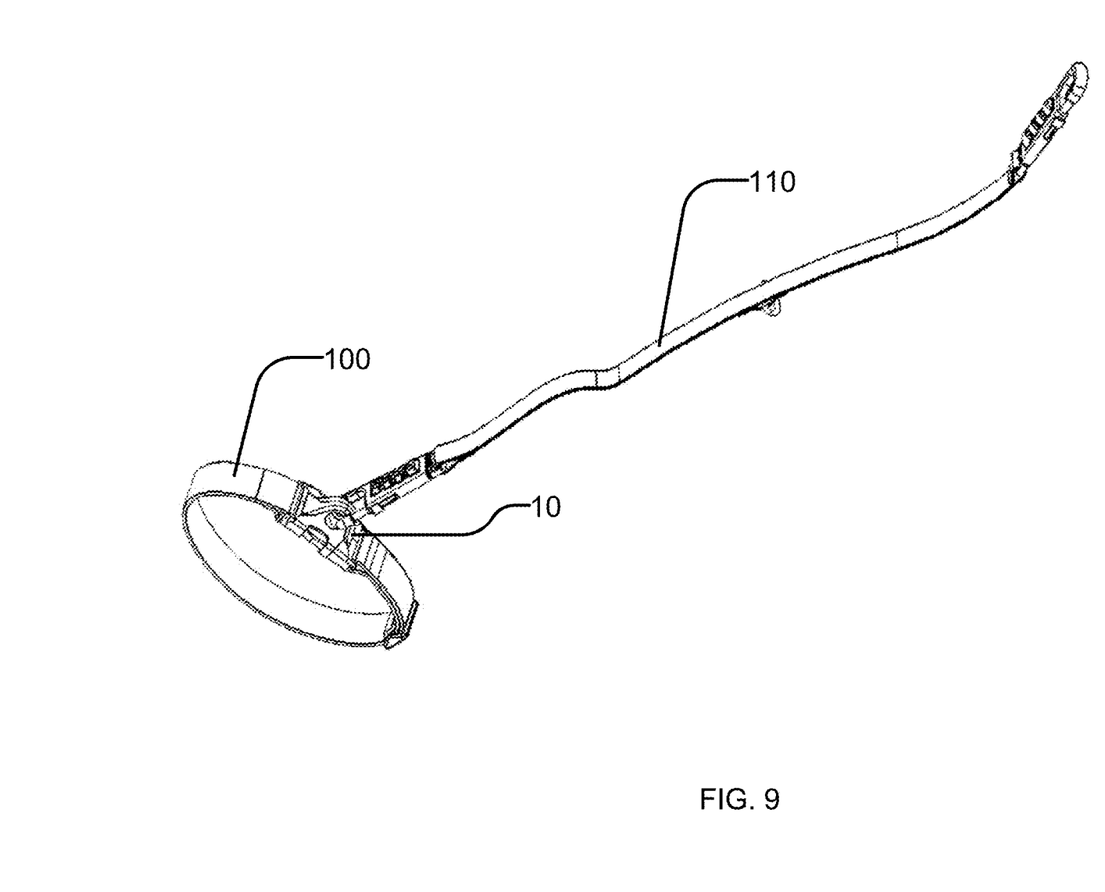
FIG. 9 is an isometric view of a leash and a collar employing a locking buckle according to an exemplary embodiment of the invention.

As another non-limiting example, locking buckle 10 may be employed as part of a dog collar. FIG. 9 depicts a dog collar 100 and leash 110 incorporating buckle 10. Previous dog collars could easily be removed from the dog by (1) releasing the side-release buckle that fastened the collar; and/or (2) loosening the collar and sliding the collar over the head of the dog. In contrast, by passing a securing device (e.g. a locking carabiner attached to a leash as depicted in FIG. 9) through first and second locking loops 29A, 39A of locking buckle 10, a would-be thief is prevented from releasing locking buckle 10 without first removing the securing device. Furthermore, the would-be thief is prevented from loosening the collar and sliding the collar over the dog's head since strap-locking bar 28 prevents or substantially hinders the adjustability of the collar, as described herein. Nonetheless, when the locking device is removed, it is possible to release the collar and/or adjust the length of the collar as desired. In this way, locking buckle 10 may be advantageously employed for dog collars.

Interpretation of Terms

Unless the context clearly requires otherwise, throughout the description and the claims:
"comprise", "comprising", and the like are to be construed in an inclusive sense, as opposed to an exclusive or exhaustive sense; that is to say, in the sense of "including, but not limited to";
"connected", "coupled", or any variant thereof, means any connection or coupling, either direct or indirect, between two or more elements; the coupling or connection between the elements can be physical, logical, or a combination thereof; elements which are integrally formed may be considered to be connected or coupled;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

Where a component (e.g. a strap, a locking device, etc.) is referred to above, unless otherwise indicated, reference to that component (including a reference to a "means") should be interpreted as including as equivalents of that component any component which performs the function of the described component (i.e. that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described herein. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

The invention claimed is:

1. A locking buckle comprising:
 a first buckle member, the first buckle member comprising:
  a first strap-receiving slot for receiving a first loop end of a strap, the first strap-receiving slot defined in part by a strap-retaining bar and a body of the first buckle member;
  a strap-locking bar pivotably attached to the body of the first buckle member, the strap-locking bar pivotable between an unlocked configuration in which the strap may freely pass through the first strap-receiving slot and a locked configuration in which the strap passing through the first strap-receiving slot is prevented from passing freely through the first strap-receiving slot;
 a second buckle member connectable to the first buckle member, the second buckle member comprising:
  a second strap-receiving slot for receiving a second loop end of the strap opposite the first loop end of the strap, the second strap-receiving slot defined by a strap-receiving bar and a body of the second buckle member;
 wherein when the first buckle member and the second buckle member are connected and the strap-locking bar is in the locked configuration, the strap-locking bar abuts the second buckle member thereby preventing the strap-locking bar from pivoting from the locked configuration to the unlocked configuration; and
 wherein when the first buckle member and the second buckle member are connected and the strap-locking bar is in the unlocked configuration, the strap-locking bar abuts the second buckle member thereby preventing the strap-locking bar from pivoting from the unlocked configuration to the locked configuration.

2. A locking buckle according to claim 1 wherein the first buckle member comprises a male member and the second buckle member comprises a female member.

3. A locking buckle according to claim 2 wherein the male member comprises a first locking loop, the female member comprises a second locking loop and wherein when the male member and the female member are connected, the first locking loop and the second locking loop align to receive a locking device.

4. A locking buckle according to claim 3 wherein the locking buckle comprises a side-release buckle and the male member comprises first and second spring prongs receivable in a receptacle of the female member.

5. A locking buckle according to claim 4 wherein the first locking loop protrudes from a center rod and the first and second spring prongs are spaced apart from the center rod.

6. A locking buckle according to claim 4 wherein the second locking loop protrudes from an upper receptacle wall of the female member.

7. A locking buckle according to claim 3 wherein the locking device comprises one of: a padlock, a locking carabiner, a zip tie, a chain lock, and a cable lock.

8. A locking buckle according to claim 2 wherein a strap-receiving opening is defined between the strap-locking bar and the body of the first buckle member and when the strap-locking bar is in the locked configuration, the strap-receiving opening is relatively smaller than when the strap-locking bar is in the unlocked configuration.

9. A locking buckle according to claim 8 wherein the strap-locking bar comprises a plurality of teeth that project into the strap-receiving opening when the strap-locking bar is in the locked configuration.

10. A locking buckle according to claim 2 wherein the strap-locking bar is attached to a handle and one of the strap-locking bar and the handle comprises a detent protrusion receivable by a detent recess defined by the body of the male member.

11. A locking buckle according to claim 2 wherein the strap-locking bar is attached to a handle and one of the strap-locking bar and the handle comprises a detent recess, wherein a detent protrusion protruding from the body of the male member is receivable in the detent recess.

12. A locking buckle according to claim 2 wherein when the male member and the female member are connected, a tab protruding from a lower receptacle wall of the female member abuts against a handle attached to the strap-locking bar when the strap-locking bar is in the locked configuration and the abutment of the tab and the handle prevents the strap-locking bar from pivoting between the locked and unlocked configurations.

13. A locking buckle according to claim 12 wherein one of the strap-locking bar and the handle comprises a detent protrusion receivable by a detent recess defined by the body of the male member.

14. A locking buckle according claim 12 wherein one of the strap-locking bar and the handle comprises a detent recess, wherein a detent protrusion protruding from the body of the male member is receivable in the detent recess.

15. A locking buckle according to claim 12 wherein the tab overlaps with the handle when the male member and female member are connected.

16. A locking buckle according to claim 12 wherein the handle comprises a recessed portion for receiving the tab of the female member.

17. A locking buckle according to claim 2 wherein the strap-locking bar comprises opposing pins pivotably received in first and second axle slots defined by the body of the male member.

18. A dog collar comprising the locking buckle of claim 1.

* * * * *